UNITED STATES PATENT OFFICE.

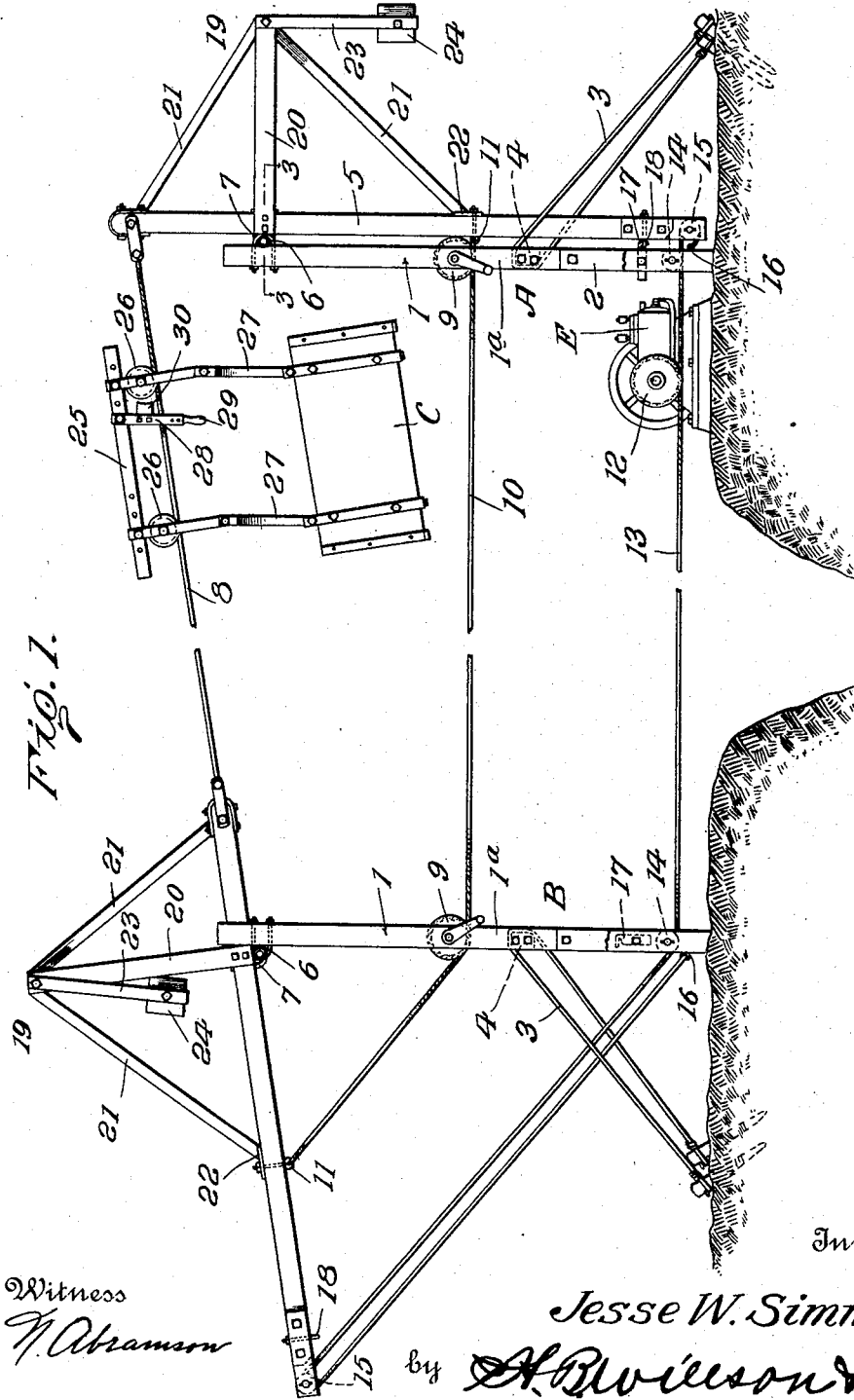

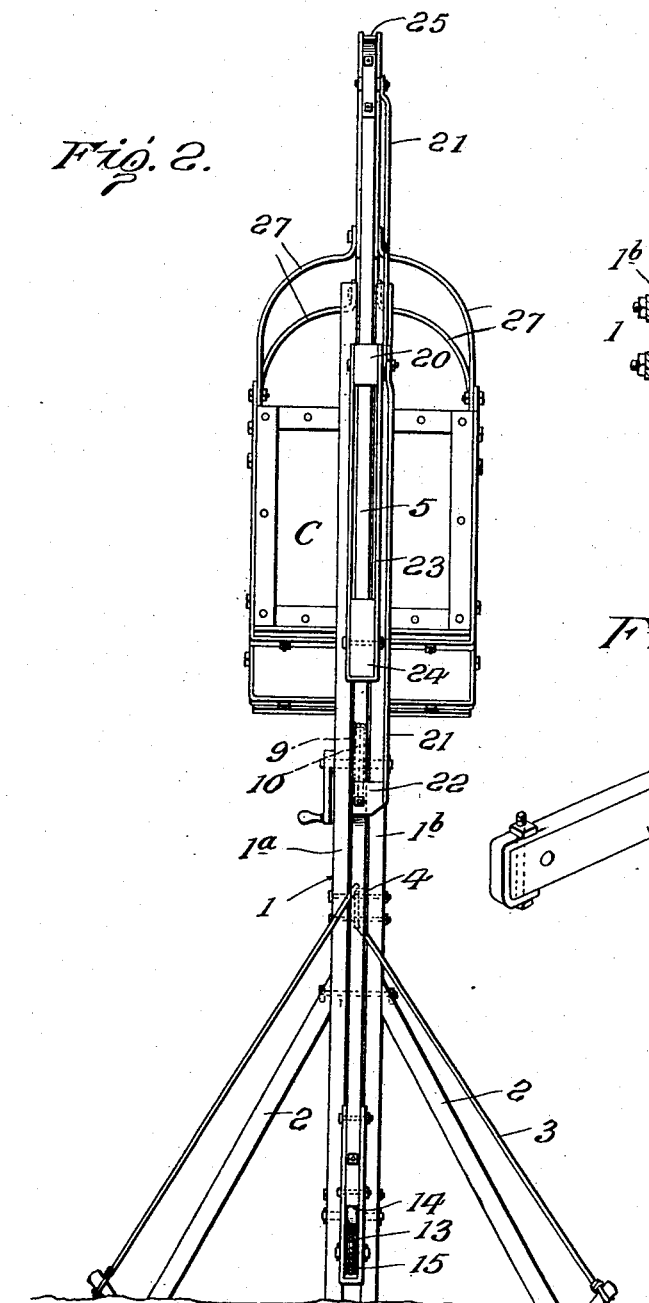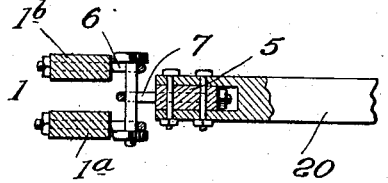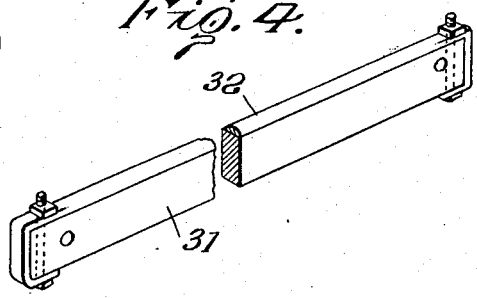

JESSE W. SIMMONS, OF NEVADA, TEXAS.

MATERIAL-TRANSPORTING APPLIANCE.

1,220,017.          Specification of Letters Patent.     Patented Mar. 20, 1917.

Application filed May 29, 1916. Serial No. 100,597.

*To all whom it may concern:*

Be it known that I, JESSE W. SIMMONS, a citizen of the United States, residing at Nevada, in the county of Collin and State of Texas, have invented certain new and useful Improvements in Material-Transporting Appliance; and I do declare the following to be a full, clear, and exact description of the invention, such as will enable others skilled in the art to which it appertains to make and use the same.

This invention relates to improvements in appliances for transporting loads from place to place.

The principal object of the invention is to provide means for transporting loads across ravines and other places which it is impossible to reach except by a circuitous route.

An additional object is to provide a device of this character by which the loads may be conveyed in either direction by gravity.

With these and many other objects in view the invention resides in the novel features of construction, combination and arrangement of parts which will hereinafter be more fully described and claimed.

In the accompanying drawings:

Figure 1 represents a side elevation of my improved material transporting appliance;

Fig. 2 is an end view thereof on a slightly enlarged scale;

Fig. 3 is a horizontal section on the plane of the line 3—3 of Fig. 1; and,

Fig. 4 is a detail perspective view of a modified form of trackway which may be used with the other parts of the appliance.

This appliance is adapted for use in many classes of work where it is necessary to convey materials from a distant point to the place where work is being carried on when the only other available way of reaching the scene of operations is by a rounabout way, or where it is impossible to reach such place except by means of an aerial trackway. In all devices of this character one portion of the appliance is situated at the place where work is being done and the other at a point where the material is loaded onto the conveyer, in the present instance both of these parts of the device are of similar construction.

The aerial trackway which will hereinafter be described is indirectly connected to a pair of spaced apart upright supporting standards 1 each of which comprises a pair of slightly spaced upright supporting members 1ª and 1ᵇ which are connected together by bolts or any other preferred means. Each of the standards 1 is supported at its base by braces 2 the upper ends of which are connected thereto while their lower ends are suitably supported in the ground, and by a guy rope or cable 3 whose free ends are also connected to the ground at spaced apart points in any preferred manner. The intermediate portions of the guys, are passed around spacing blocks 4 between the two parts of the standards 1. As shown these guys extend outwardly away from the standards so as to prevent the latter from moving inwardly toward each other. To the upper ends of each of the standards 1 is pivoted a lever 5, said levers being fulcrumed nearer one end than the other. These levers are pivoted to the standards by means of ears 6 and 7, the pair of ears 6 being secured to each standard 1 and having the ears 7 disposed therebetween, each of said ears being in the form of a U-bolt secured in any preferred manner to the standards and levers. The ear 7 on each of the levers is preferably disposed at a point about one-fourth the distance from the inner or upper end thereof.

To the short ends of the levers 5 an aerial trackway preferably in the form of a cable 8 is secured and adapted to have any preferred form of car or cage C disposed for sliding movement thereon. When it is desired to transport material in the car from a point designated by the letter A to a place B, the cable 8 is so disposed that it will be inclined downwardly from the portion of the appliance at A to the other part at B, thus readily permitting the car C to move by gravity along said cable. In order to so incline the trackway the lever 5 at point A is moved until it is in substantially vertical position while the other lever at B is moved in substantially horizontal position, thus disposing the point of connection of the first mentioned lever 5 and the adjacent end of the cable 8 above the point of connection of the other end of the cable with the other lever. This movement of the levers 5 is accomplished simultaneously by one of two means, one of said means consisting of a pair of drums 9 and cable 10, one of the former being rotatably secured to each of the standards 1 and the latter is wound thereon, the opposite ends thereof being secured to the levers 5 by means of the eyes 11 which are disposed intermediate the ends thereof. With each of the drums 9 is connected a suitable crank in order that the same may be rotated at any time to move the cable, which in turn will actuate the levers 5 to cause them to simultaneously change their positions relative to the standards 1. From the drawings it will be seen that when either of the drums 9 are rotated in the proper direction the levers 5 at A will be moved into vertical position while the lever at B will be moved into a horizontal position, the movement of the last mentioned lever being accomplished with the movement of the cable 8 as will be evident without further description.

In addition to the above described manual means for simultaneously shifting the positions of the levers 5, I have also provided a mechanical means for accomplishing the same purpose. This comprises a drum 12 which is keyed to the shaft of any suitable type of engine E and a cable 13 which is wound therearound. The end portions of this cable are extended around guide pulleys 14 between the lower ends of the members 1$^a$ and 1$^b$ comprising the standards 1, around additional pulleys 15 carried by the outer ends of the long parts of the levers 5, and then are attached by their free ends to the eyes 16 of the standard 1 adjacent the guides 14. The operation of the drum 12, as will be seen, actuates the levers 5 in the same manner as the rotation of the drums 9 but in a much simpler and easier manner. It sometimes becomes expedient to lock the upright lever in this position until the car C has reached the limit of its travel, this means consisting of hooks 17 and eyes 18, one each of the former being pivoted between the members of each standard 1 adjacent the lower end, and the latter are carried by each lever 5.

This means for holding one of the levers in upright position is ordinarily not necessary except when the loads which are to be conveyed in the car C are excessively heavy. For all ordinary loads an over-balancing means, designated broadly by the numeral 19, and carried by each of the levers 5 is sufficient. This means on each of the levers comprises an arm 20 which extends at right angles therefrom at the pivot point and is braced by a pair of brace members 21 which are connected to the outer end of the arm 20 and to the lever 5 at spaced apart points thereon, one of the brace members having a foot 22 by which it is attached to the lever by the eye bolts 11 and the other brace member is secured to the lever on the opposite side of the arm 20 by the bolt which secures the cable 8 thereto. These arms 20 are of any preferred length, but are shown as being about one-third the length of the levers 5, and carrying on their free ends swinging arms 23 to the free ends of which weights 24 are attached. These weights are sufficient to hold the levers 5 in their vertical positions against the weight of the car C so that it is unnecessary to lock the same by the catch members 17 and 18. From the drawings it will be seen that when one of the levers is in its horizontal position the weight 24 thereon is substantially inoperative inasmuch as it is disposed almost over the fulcrum point, but the other lever being in its vertical position is acted upon by the weight because it is disposed at a considerable distance beyond the fulcrum point. When, however, it is desired to move the car in the reverse direction and the levers are shifted to incline the cable 8 in the opposite direction, the other weight 24 becomes active, while the one which was active before now becomes inactive. From this description it is obvious that a very simple arrangement has been provided whereby the trackway formed of the cable 8 will be held in inclined position by the overbalancing means on one of the levers 5 until it is mechanically or manually shifted by moving the levers 5 into their opposite positions.

Any preferred means may be employed for suspending the car C upon the cable 8, that shown comprising a carriage 25, and a pair of pulley wheels 26 which engage and run on the cable 8 or any other trackway which may be employed. This carriage 25 has the cage C connected thereto by means of arched hangers 27. In addition the carriage also has pivoted thereto a depending swinging arm 28 having a handle 29 and a brake shoe 30 which is adapted to engage one of the wheels 26 when the handle 29 is moved in the proper direction so as to regulate the speed of the carriage and its car C upon the trackway.

While the trackway is preferably formed of a cable 8 as hereinbefore mentioned, it may also be formed in any other preferred manner. In Fig. 4 is shown a modified form of trackway which consists of a wooden or metal bar 31 of any suitable length which has a curved metal shoe 32 extending throughout its length on its upper edge. The opposite end of this bar may be connected to the short ends of the levers 5 in a manner similar to that used for connecting the cable 8 thereto.

I claim:

1. In an appliance of the class described, a pair of spaced apart track supporting devices, each comprising an upright supporting standard, a lever fulcrumed to the upper end of the standard, said lever being pivoted nearer one end than the other, an arm extending outwardly at right angles to the lever at its fulcrum point and rigidly fixed thereto, brace bars connecting the outer ends of the arm and the lever, a swinging arm pivoted to the outer end of the fixed arm, and a weight carried by the free end of said swinging arm, whereby overbalancing means is provided, the means on one device being inactive when the other is active, a track connecting the short ends of said levers, and a connection between the opposite ends of the levers to simultaneously operate the same.

2. In an appliance of the class described, a pair of spaced apart track supporting devices, each comprising an upright supporting standard, a lever fulcrumed to the upper end of the standard, said lever being pivoted nearer one end than the other, an arm extending outwardly at right angles to the lever at its fulcrum point and rigidly fixed thereto, brace bars connecting the outer ends of the arm and the lever, a swinging arm pivoted to the outer end of the fixed arm, and a weight carried by the free end of said swinging arm, whereby overbalancing means is provided, the means on one device being inactive when the other is active, a track connecting the short ends of said levers, a winding drum, a cable disposed around said drum, the opposite ends of said cable being connected with the long ends of said levers, and means for rotating said drum in either direction in order to simultaneously operate said levers.

3. In an appliance of the class described, a pair of spaced apart track supporting devices, each comprising an upright support, a lever fulcrumed to the upper end of the support, said lever being pivoted nearer one end than the other, an arm extending outwardly from said lever adjacent its fulcrum point, and a weight carried by the free end of said arm, whereby overbalancing means is provided, the means on one device being inactive when the other is active, a track connecting the short ends of said lever, a winding drum, a cable disposed around said drum, guides on the opposite ends of said levers, additional guides adjacent the lower ends of said supports, said cable being passed around said guides and secured at its opposite ends adjacent the lower ends of said supports, and means for rotating said drum in either direction to simultaneously operate said levers.

In testimony whereof I have hereunto set my hand in presence of two subscribing witnesses.

JESSE W. SIMMONS.

Witnesses:
  J. JAMES,
  W. A. TURPEN.

Copies of this patent may be obtained for five cents each, by addressing the "Commissioner of Patents, Washington, D. C."